United States Patent
Wolfe et al.

(10) Patent No.: US 10,422,373 B1
(45) Date of Patent: Sep. 24, 2019

(54) MACHINE THRUST BEARING ASSEMBLY

(71) Applicant: General Electric Company, Schenectady, NY (US)

(72) Inventors: Christopher Edward Wolfe, Niskayuna, NY (US); Adolfo Delgado, College Station, TX (US); Nathan Gibson, Cincinnati, OH (US); Deepak Trivedi, Niskayuna, NY (US); Bugra Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/944,844

(22) Filed: Apr. 4, 2018

(51) Int. Cl.
*F16C 17/04* (2006.01)
*F16C 33/16* (2006.01)

(52) U.S. Cl.
CPC ............ *F16C 17/047* (2013.01); *F16C 33/16* (2013.01); *F16C 2380/26* (2013.01)

(58) Field of Classification Search
CPC ..... F16C 17/047; F16C 33/16; F16C 2380/26
See application file for complete search history.

(56) References Cited

U.S. PATENT DOCUMENTS

| 3,702,719 | A | 11/1972 | Hoffman |
| 4,309,144 | A * | 1/1982 | Eggmann .................. F01D 3/04 |
| | | | 415/105 |
| 5,042,616 | A | 8/1991 | McHugh |
| 6,220,829 | B1 | 4/2001 | Thompson et al. |
| 6,435,721 | B1 * | 8/2002 | Inoue .................. G11B 19/2009 |
| | | | 384/112 |
| 6,962,443 | B2 * | 11/2005 | Gomyo .................. F16C 17/045 |
| | | | 384/107 |
| 7,042,125 | B2 | 5/2006 | LeBlanc et al. |
| 7,318,672 | B2 | 1/2008 | Hardcastle, III |

(Continued)

FOREIGN PATENT DOCUMENTS

| JP | 2001153134 A | 6/2001 |
| JP | 2015224674 A | 12/2015 |

OTHER PUBLICATIONS

Dykas et al., "Design, Fabrication, and Performance of Foil Gas Thrust Bearings for Microturbomachinery Applications", Journal of Engineering for Gas Turbines and Power, Oct. 1, 2008, vol. 131, Issue: 2; 8 pages.

*Primary Examiner* — Thomas R Hannon
(74) *Attorney, Agent, or Firm* — Philip S. Hof; The Small Patent Law Group, LLC

(57) ABSTRACT

A thrust bearing assembly for a machine includes a stator housing, a fluid film thrust bearing, and a ring bearing. The stator housing surrounds at least a segment of a rotor shaft and one or more runners on the rotor shaft that include a first runner surface and a second runner surface facing in opposite axial directions along the rotor shaft. The fluid film thrust bearing is axially held between a first stator surface of the stator housing and the first runner surface. The fluid film thrust bearing is configured to generate a fluid cushion that blocks the first runner surface from engaging the fluid film thrust bearing. The ring bearing is axially held between a second stator surface of the stator housing and the second runner surface. The ring bearing has an annular contact surface that engages the second runner surface to axially support the rotor shaft.

23 Claims, 5 Drawing Sheets

(56) References Cited

U.S. PATENT DOCUMENTS

| | | | |
|---|---|---|---|
| 7,665,954 B2 * | 2/2010 | Ide | F04D 29/0413 |
| | | | 415/104 |
| 7,703,290 B2 | 4/2010 | Bladon et al. | |
| 7,832,934 B2 * | 11/2010 | Hemmi | F16C 17/04 |
| | | | 384/121 |
| 7,856,719 B2 | 12/2010 | Aiello | |
| 8,104,972 B2 | 1/2012 | Maguire et al. | |
| 8,732,954 B2 | 5/2014 | Aiello et al. | |
| 10,151,341 B2 * | 12/2018 | Delgado Marquez | F16C 39/02 |
| 2006/0120854 A1 | 6/2006 | Wakeman et al. | |
| 2011/0123327 A1 | 5/2011 | Dewhurst et al. | |
| 2016/0356275 A1 * | 12/2016 | Delgado Marquez | F16C 17/26 |

* cited by examiner

MACHINE THRUST BEARING ASSEMBLY

FIELD

The subject matter described herein relates to machinery including rotating shafts, and more particularly, to thrust bearing assemblies that axially support the rotating shafts within the machinery.

BACKGROUND

Some machines include rotating shafts that are supported by bearing assemblies. For example, turbo machines such as gas turbine engines can operate by axial flow of a working fluid along a rotating shaft. The rotating shafts may be subjected to axial thrust forces exerted by the working fluid in opposite directions. The rotating shaft typically includes one or more runners or thrust plates extending therefrom that exert axial force against a thrust bearing assembly to maintain the axial position of the rotating shaft when exposed to the bi-directional thrust forces. Typical thrust bearing assemblies include two identical or at least similar types of thrust bearings that bear against opposite faces of the one or more runners. The thrust bearings are configured to absorb the full thrust forces in both directions to maintain the axial position of the rotating shaft.

The thrust bearings in typical thrust bearing assemblies can be relatively complex, including specially manufactured and assembled structures. Some thrust bearing assemblies utilize oil for lubrication between the thrust bearings and the runners. The oil may be relatively messy and may risk leakage from the thrust bearing assembly. Other thrust bearing assemblies are configured to utilize gas for lubrication by pumping a gas such as air through the thrust bearings and/or by specially-forming the thrust bearings to control gas flow. Additionally, the thrust bearing assemblies may be configured such that the runners mechanically engage the thrust bearings under certain conditions, such as during start-up and shut-down of the machine while the shaft rotates at speeds less than a designated operating speed. Some known thrust bearings and/or runners of the shafts are treated to include low friction coatings to reduce the frictional effects on the contacting surfaces and extend the lifetime of the thrust bearings. Due to the designs and features described above, typical thrust bearing assemblies may be relatively costly to produce and maintain.

SUMMARY

In an embodiment, a thrust bearing assembly for a machine is provided. The thrust bearing assembly includes a stator housing, a fluid film thrust bearing, and a ring bearing. The stator housing is configured to surround at least a segment of a rotor shaft and one or more runners on the rotor shaft. The one or more runners include a first runner surface and a second runner surface that face in opposite axial directions along the rotor shaft. The fluid film thrust bearing is axially held between a first stator surface of the stator housing and the first runner surface. The fluid film thrust bearing is configured to generate a fluid cushion that blocks the first runner surface from engaging the fluid film thrust bearing. The ring bearing is axially held between a second stator surface of the stator housing and the second runner surface. The ring bearing has an annular contact surface that engages the second runner surface to axially support the rotor shaft.

In an embodiment, a machine is provided that includes a rotor, a stator housing, and a fluid film thrust bearing. The rotor includes a shaft and one or more runners on the shaft. The shaft is elongated along a shaft axis oriented parallel to gravity between a top end and a bottom end of the shaft. The stator housing surrounds at least a segment of the shaft including the one or more runners. The fluid film thrust bearing is axially held between an upper surface of the one or more runners and the stator housing. The upper surface faces towards the top end of the shaft. The rotor is configured to axially move relative to the stator housing towards the fluid film thrust bearing from a rest position to a lifted position responsive to a rotational speed of the rotor exceeding a threshold speed. The fluid film thrust bearing is configured to generate a fluid cushion that blocks axial movement of the rotor beyond the lifted position.

In an embodiment, a machine is provided that includes a rotor and a thrust bearing assembly. The rotor includes a shaft and one or more runners on the shaft. The shaft is elongated along a shaft axis. The one or more runners include a first runner surface and a second runner surface that face in opposite directions along the shaft axis. The thrust bearing assembly includes a fluid film thrust bearing and a ring bearing. The fluid film thrust bearing is axially located between the first runner surface and a first stator surface of a stator housing. The ring bearing is axially located between the second runner surface and a second stator surface of the stator housing. The rotor is configured to axially move relative to the thrust bearing assembly from a rest position to a lifted position responsive to a rotational speed of the rotor exceeding a threshold speed. The rotor is biased towards the rest position by a biasing force. The ring bearing has an annular contact surface that engages the second runner surface when the rotor is in the rest position to axially support the rotor.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments described herein provide a thrust bearing assembly and a machine having the same. The thrust bearing assembly may have a reduced complexity and/or cost relative to some known thrust bearing assemblies. The thrust bearing assembly may be asymmetric, such that one type of thrust bearing blocks axial movement of the rotating shaft in a first axial direction, and a different, second type of thrust bearing blocks axial movement of the rotating shaft in the opposite axial direction. In one or more embodiments, the second type of bearing is a ring bearing that has a continuous annular contact surface. The ring bearing may be less complex and cheaper to produce than the first thrust bearing, which may be a fluid film thrust bearing. Due to the design of the machine and the thrust bearing assembly therein, additional cost savings may be achieved by omitting low friction coatings that are typically applied on the runners of the rotor shaft and/or on the thrust bearings. One or more embodiments of the thrust bearing assembly and machine described herein may conserve monetary resources and reduce maintenance without compromising design robustness and efficiency relative to known machines with thrust bearing assemblies.

Figure 1:
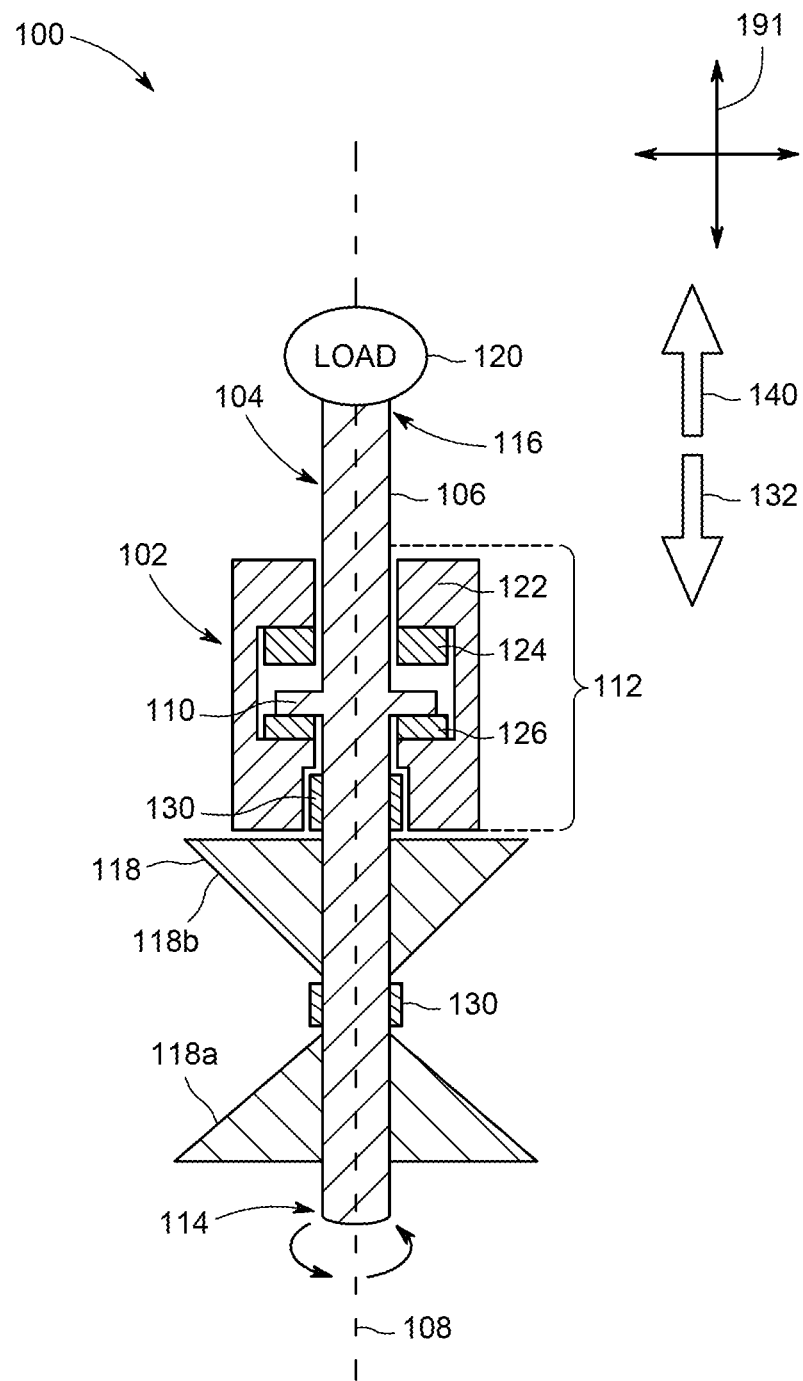
FIG. 1 is a cross-sectional illustration of one embodiment of a machine.

FIG. 1 is a cross-sectional illustration of one embodiment of a machine 100. The machine 100 includes a thrust bearing assembly 102 and a rotor 104. In the illustrated embodiment, the machine 100 is a turbo-machine, such as a gas turbine engine, a steam turbine engine, a turbocharger, a generator, an induction motor, or the like. It is understood, however, that the thrust bearing assembly 102 may be installed on any machine that includes a rotating shaft subject to axial forces along an axis of the rotating shaft. Thus, the machine 100 shown in FIG. 1 is a non-limiting example embodiment.

The rotor 104 of the machine 100 includes a rotor shaft 106 that is elongated along a shaft axis 108. The rotor 104 is configured to rotate about the shaft axis 108. The rotor 104 includes one or more runners 110 on the rotor shaft 106, which is also referred to herein as shaft 106. Each runner 110 extends radially from the shaft 106. The one or more runners 110 may be integral protrusions of a unitary, one-piece shaft 106, or alternatively may be discrete components coupled to the shaft 106. The rotor 104 in the illustrated embodiment includes a single runner 110, but may include multiple runners 110 that are axially spaced apart from each other in an alternative embodiment. The runner 110 is located at an intermediate segment 112 of the shaft 106 that is spaced apart from first and second ends 114, 116 of the shaft 106. The rotor 104 also includes one or more rotor wheels 118 on the shaft 106. The rotor wheels 118 are axially spaced apart from the runner 110. Each rotor wheel 118 includes a plurality of blades (not shown) that are disposed circumferentially around the shaft 106 and rotate with the shaft 106. Although not shown, the machine 100 includes a plurality of stationary vanes that extend towards the rotor 104 between adjacent rows of the blades in each rotor wheel 118. The stationary vanes cooperate with the blades to form a plurality of stages. In the illustrated embodiment, the rotor 104 includes two rotor wheels 118a, 118b. The machine 100 may be configured such that one of the rotor wheels 118a is a compressor, and the other rotor wheel 118b is a turbine, or vice-versa. For example, in an embodiment in which the machine 100 is a gas turbine engine, such as an auxiliary power unit on an aircraft, the rotor wheel 118a may be a compressor, the rotor wheel 118b may be a turbine, and the machine 100 may include a combustion chamber (not shown) axially between the compressor 118a and the turbine 118b. The rotor 104 may include more or less than two rotor wheels 118 in an alternative embodiment.

In the illustrated embodiment, the second end 116 of the shaft 106 is operatively coupled to a load 120. The rotation of the shaft 106 may be used to power the load 120. The load 120 according to some non-limiting examples may include or represent a generator, an alternator, another turbine or fan, or another machine.

In operation of the machine 100, a working fluid such as air, steam, or another gas may be channeled through an inlet conduit and directed axially through the rotor wheels 118. For example, in a turbine (e.g., the wheel 118b), the working fluid passes through the stages of the blades and vanes, imparting a rotational force on the blades causing the shaft 106 to rotate. The shaft 106 also receives thrust forces in the first axial direction and/or the second axial direction due to the axial flow of the working fluid and various pressure drops across the stages. The thrust bearing assembly 102 can withstand the thrust forces imparted on the shaft 106 to maintain the axial position of the rotor 104 relative to the thrust bearing assembly 102 and other components of the machine 100.

The thrust bearing assembly 102 includes a stator housing 122, a fluid film thrust bearing 124, and a ring bearing 126. The stator housing 122 circumferentially surrounds the intermediate segment 112 of the shaft 106, and optionally may surround additional segments of the shaft 106. As such, the stator housing 122 circumferentially surrounds the runner 110. The rotor 104 is configured to rotate relative to the stator housing 122, which may remain static as the rotor 104 rotates.

Although shown in cross-section, the fluid film thrust bearing 124 and the ring bearing 126 may have annular shapes that circumferentially surround the shaft 106. Optionally, the stator housing 122 circumferentially surrounds the fluid film thrust bearing 124 and the ring bearing 126, such that the bearings 124, 126 are radially disposed between the shaft 106 and at least a portion of the stator housing 122. The fluid film thrust bearing 124 is a different type of bearing than the ring bearing 126. Both the fluid film thrust bearing 124 and the ring bearing 126 are held between the stator housing 122 and the runner 110. The fluid film thrust bearing 124 and the ring bearing 126 are configured to block or restrict axial movement of the rotor 104 relative to the stator housing 122. For example, the fluid film thrust bearing 124 blocks movement of the rotor 104 in a first axial direction, and the ring bearing 126 blocks movement of the rotor 104 in a second axial direction that is opposite the first axial direction.

As described in more detail herein, the fluid film thrust bearing 124 blocks the movement of the rotor 104 in the first axial direction by generating a fluid cushion between the fluid film thrust bearing 124 and the runner 110. The fluid cushion may be an air cushion or an oil film. For example, the fluid cushion may prevent the runner 110 from engaging the fluid film thrust bearing 124. As used herein, the term "engage" refers to direct mechanical contact. In one or more embodiments, the ring bearing 126 blocks the movement of the rotor 104 in the second axial direction by engaging the runner 110. For example, the runner 110 may rotate relative to the thrust bearing assembly 102 while in engagement with the ring bearing 126 during at least some rotational speeds of the rotor 104. In at least one embodiment, the rotor 104 is configured to move axially (e.g., parallel to the shaft axis 108) relative to the thrust bearing assembly 102 based on the rotational speed of the rotor 104.

The machine 100 may include one or more journal bearings 130 or other types of radial bearings that are configured to support and maintain the radial position of the shaft 106, such as by preventing the shaft 106 from tilting and/or translating radially. Two journal bearings 130 are shown in the illustrated embodiment, but the machine 100 may have any number of journal bearings 130. The journal bearings 130 may be held by the stator housing 122 and/or by another base structure.

In the illustrated embodiment, the shaft 106 is oriented along a vertical axis 191, such that the shaft axis 108 is approximately parallel (e.g., within 2 degrees, within 5 degrees, within 10 degrees, or the like) to the vertical axis 191. The vertical axis 191 is parallel to the direction of gravitational force 132 exerted on the machine 100. The first end 114 of the shaft 106 is a bottom end, and the second end 116 of the shaft 106 is a top end (relative to gravity). The fluid film thrust bearing 124 is configured to block movement of the rotor 104 in the upward direction, which represents the first axial direction. The ring bearing 126 is configured to block movement of the rotor 104 in the downward direction, which represents the second axial direction.

The rotor 104 is configured to move vertically relative to the thrust bearing assembly 102 based on the rotational speed of the rotor 104. For example, FIG. 1 shows the rotor 104 in a rest or lowered position, which is achieved when the rotor 104 is static and when the rotor 104 is rotating at speeds lower than a threshold rotational speed. The rotor 104 may be static while the machine 100 is off. The rotor 104 may rotate at speeds below the threshold speed during start-up and shut-down periods of the machine 100. In response to the rotational speed of the rotor 104 exceeding the threshold speed, the rotor 104 moves vertically upward from the rest position to a lifted or raised position. In the lifted position, a gap between the runner 110 and the fluid film thrust bearing 124 is reduced relative to the height of the gap in the rest position. The rotor 104 may rise vertically upward in response to a magnitude of a thrust force 140 in the upward direction that is exerted by the working fluid on the rotor 104 exceeding downward forces. For example, the upward thrust force 140 may exceed the sum of the downward gravitational force 132, and any other biasing forces acting on the rotor 104 towards the rest position (e.g., downward thrust forces, spring forces, magnetic forces, or the like). The machine 100 may be intentionally tuned to achieve a net upward force on the rotor 104 when the rotor 104 rotates at speeds at or exceeding the threshold speed. The threshold speed may be lower than an operating speed of the rotor 104, such that the rotor 104 is in the lifted position during general operation of the machine 100.

Although the rotor 104 is oriented vertically in the illustrated embodiment, the rotor 104 may be oriented horizontally with respect to gravity or at other angular orientations in one or more other embodiments. In cases where the rotor is not oriented vertically, the biasing force of gravity may be replaced by a magnetic force or a spring force that biases the rotor 104 in one direction (e.g., towards the ring bearing 126 in the rest position), as described herein with reference to FIG. 6. Furthermore, the illustrated arrangement of the components of the machine 100 in FIG. 1 represents a non-limiting example arrangement, and other arrangements are possible in other embodiments. For example, the rotor wheels 118 may be disposed axially between the load 120 and the thrust bearing assembly 102 in an alternative embodiment (instead of the thrust bearing assembly 102 between the load 120 and the rotor wheels 118).

Figure 2:
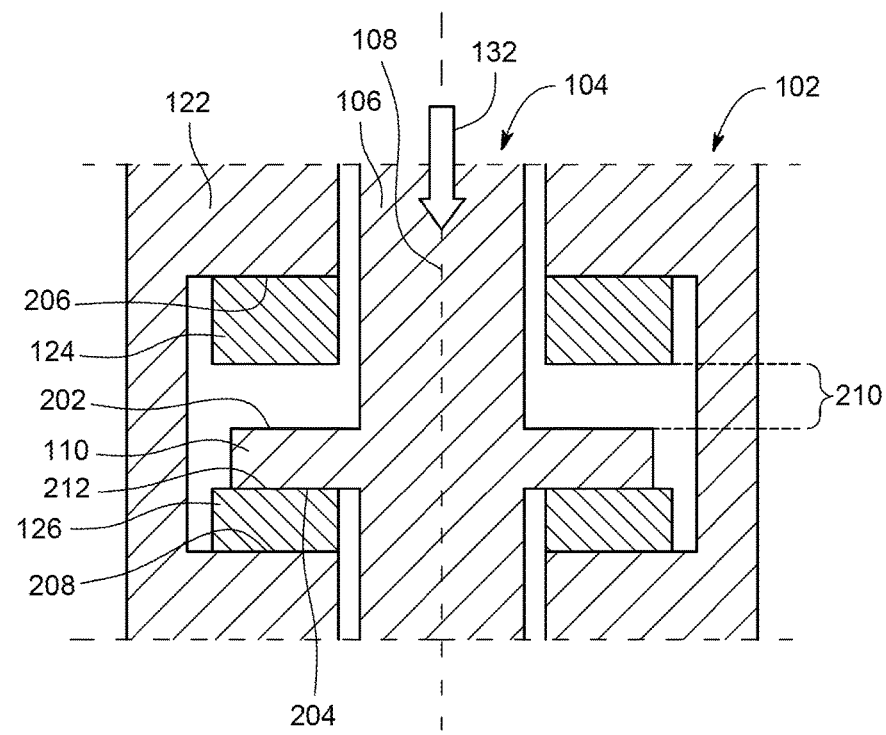
FIG. 2 is an enlarged view of a portion of the machine shown in FIG. 1 with a resting rotor and a thrust bearing assembly.

FIG. 2 is an enlarged view of a portion of the machine 100 shown in FIG. 1 with the rotor 104 and the thrust bearing assembly 102. The rotor 104 is in the rest position relative to the thrust bearing assembly 102 in FIG. 2. The runner 110 includes a first runner surface 202 and a second runner surface 204 that face in opposite axial directions along the shaft 106. In the illustrated embodiment, the runner 110 defines both the first and second runner surfaces 202, 204, but in an alternative embodiment one runner 110 defines the first runner surface 202 and another runner 110 defines the second runner surface 204, as shown and described with reference to FIG. 6. The fluid film thrust bearing 124 is held axially (e.g., along the shaft axis 108) between the first runner surface 202 and a first stator surface 206 of the stator housing 122 that faces the first runner surface 202. In the illustrated embodiment, the fluid film thrust bearing 124 is mounted to the stator housing 122 on the first stator surface 206. For example, the fluid film thrust bearing 124 may be affixed to the first stator surface 206 via an adhesive, a fastener, an interference or friction fit, or the like.

The ring bearing 126 is located axially between the second runner surface 204 and a second stator surface 208 of the stator housing 122 that faces the second runner surface 204. The ring bearing 126 may be mounted to the stator housing 122 on the second stator surface 208. The ring bearing 126 may be affixed to the second stator surface 208 via an adhesive, a fastener, an interference or friction fit, or the like. For example, the ring bearing 126 may be at least partially embedded in the second stator surface 208 within a slot or groove (not shown) of the stator housing 122, and held in the slot via an interference fit. The runner 110 is axially located between the fluid film thrust bearing 124 and the ring bearing 126.

In the illustrated embodiment in which the shaft 106 of the rotor 104 is oriented vertically, the first runner surface 202 of the runner 110 faces vertically upward and is referred to herein as an upper surface 202. The second runner surface 204 of the runner 110 faces vertically downward and is referred to herein as a lower surface 204. The fluid film thrust bearing 124 is located above the runner 110 (and the upper surface 202 thereof). The ring bearing 126 is located below the runner 110 (and the lower surface 204 thereof). The fluid film thrust bearing 124 is configured to block upward movement of the rotor 104 beyond the designated lifted position of the rotor 104, and the ring bearing 126 blocks downward movement of the rotor 104 beyond the rest position.

The rotor 104 is in the rest position in FIG. 2. In the rest position, the ring bearing 126 engages the lower surface 204 of the runner 110. The fluid film thrust bearing 124 is vertically spaced apart from the upper surface 202 of the runner 110 by a gap 210. The rotor 104 may be rotationally static or rotating at a speed below the threshold speed. In either condition, the downward gravitational force 132 on the rotor 104 (e.g., the weight of the rotor 104) exceeds any upward thrust force exerted by a working fluid on the rotor 104, such that the runner 110 rests on the ring bearing 126. The ring bearing 126 vertically supports the rotor 104. The ring bearing 126 may have a continuous annular contact surface 212 that is configured to engage the lower surface 204 of the runner 110. The ring bearing 126 may have a composition that allows sliding contact with the runner 110 with limited friction and limited deterioration of the contact surface 212. For example, the ring bearing 126 may be a carbon ring that is at least partially composed of carbon.

Figure 3:
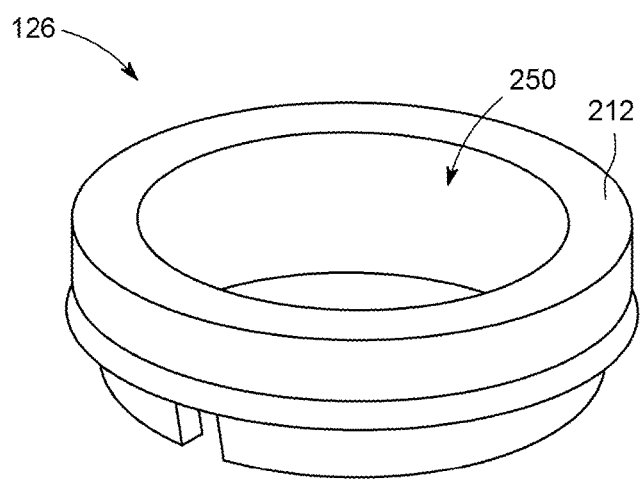
FIG. 3 is a perspective view of one embodiment of a ring bearing of the thrust bearing assembly shown in FIG. 2.

FIG. 3 is a perspective view of one embodiment of the ring bearing 126 of the thrust bearing assembly 102 shown in FIG. 2. The ring bearing 126 includes the annular contact surface 212 that extends continuously and uniformly along an entire circumference of the ring bearing 126. The annular contact surface 212 may be flat or planar. The ring bearing 126 defines a central cavity 250 that receives the shaft 106 (shown in FIG. 1) therethrough. The diameter of the central cavity 250 is less than an outer diameter of the runner 110 (FIG. 2), such that the runner 110 cannot pass through the central cavity 250 due to engagement with the annular contact surface 212. The ring bearing 126 in the illustrated embodiment is a carbon ring that is at least partially composed of carbon. For example, the annular contact surface 212 may be at least partially composed of carbon, which may enable the annular contact surface 212 to have a relatively low coefficient of friction.

Figure 4:
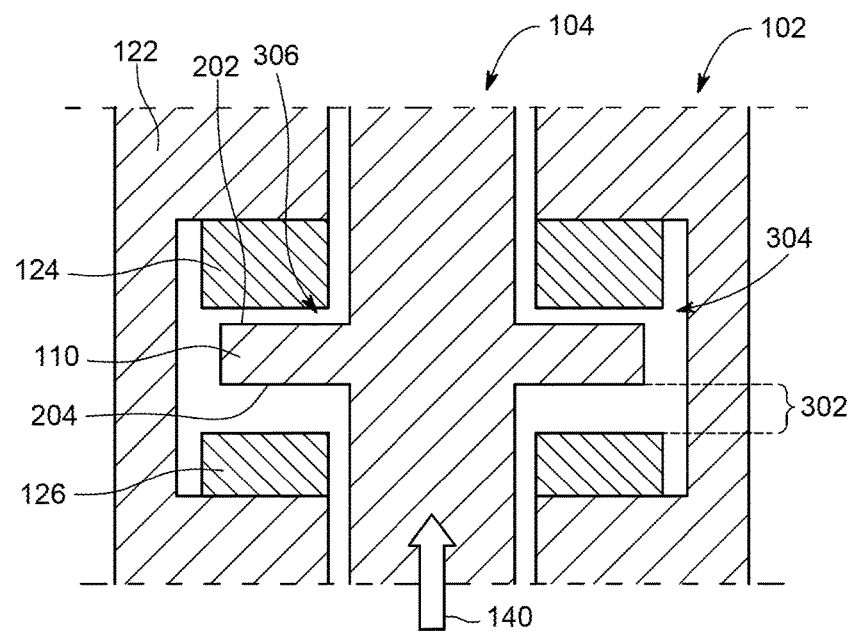
FIG. 4 is an enlarged view of a portion of the machine shown in FIG. 1 with the rotor in a lifted position.

FIG. 4 is an enlarged view of a portion of the machine 100 shown in FIG. 1 with the rotor 104 in the lifted position relative to the thrust bearing assembly 102. The rotor 104 is configured to move vertically upward relative to the stator housing 122 from the rest position to the lifted position responsive to the rotational speed of the rotor 104 exceeding the threshold speed. Upon the rotational speed reaching the threshold speed, the upward thrust force 140 exerted on the rotor 104 by the working fluid, as described with reference to FIG. 1, exceeds the downward gravitational force (e.g., the weight of the rotor 104) and any downward thrust forces, resulting in a net upward force. The net upward force causes the rotor 104 to rise, which lifts the runner 110 off of the ring bearing 126. Thus, at speeds at or above the threshold speed, the ring bearing 126 is mechanically separate from the rotor 104. For example, the lower surface 204 of the runner 110 is vertically spaced apart from the ring bearing 126 by a gap 302.

As described above, the machine 100 (shown in FIG. 1) may be tuned such that the threshold speed is below the operating speed or range of speeds of the rotor 104. The operating speed or range represents the speed(s) achieved while the machine 100 is actively functioning, such as to power the load 120 (FIG. 1). For example, the operating speeds of the rotor 104 may be 50,000 RPMs, and the machine 100 may be tuned such that the rotor 104 rises from the rest position to the lifted position at 10,000 RPMs. Since the rotor 104 is in the lifted position at the operating speed, the rotor 104 does not engage the ring bearing 126 while rotating at the operating speeds. In at least one embodiment, the rotor 104 may only rotate in physical contact with the ring bearing 126 during start-up and shut-down while the rotor 104 spins at relatively low speeds. Avoiding mechanical contact between the rotor 104 and the ring bearing 126 at the operating speeds and allowing mechanical contact only at slower rotating speeds for limited durations may beneficially reduce frictional energy loss and may extend the life of the components (relative to the rotor 104 engaging the ring bearing 126 at the higher speeds and/or for longer durations).

The stator housing 122 is sized and shaped to allow the rotor 104 to float axially (e.g., vertically) relative to the stator housing 122 a given distance to allow the rotor 104 to translate between the rest and lifted positions. For example, the stator housing 122 defines a recess 304 that provides clearance to allow the runner 110 to float vertically between the fluid film thrust bearing 124 above and the ring bearing 126 below responsive to forces (e.g., gravitational, thrust, and the like) exerted on the rotor 104.

The fluid film thrust bearing 124 is configured to generate a fluid cushion that blocks upward movement of the rotor beyond the lifted position. Due to the fluid cushion, the fluid film thrust bearing 124 is mechanically separate and vertically spaced apart from the upper surface 202 of the runner 110. For example, the fluid cushion causes a narrow gap 306 between the fluid film thrust bearing 124 and the upper surface 202. The narrow gap 306 has a smaller height than the gap 210 that is present when the rotor 104 is in the rest position, as shown in FIG. 2, due to the runner 110 moving towards the fluid film thrust bearing 124 during the transition from the rest position to the lifted position. In an embodiment, the fluid film thrust bearing 124 does not engage the upper surface 202 of the runner 110 in either the rest position or the lifted position.

Since the fluid film thrust bearing 124 does not engage the runner 110, there may be very limited frictional energy loss as the runner 110 rotates along the fluid cushion. Furthermore, the lack of mechanical engagement between the fluid film thrust bearing 124 and the upper surface 202 of the runner 110 may extend the life of the components by reducing deterioration and damage (relative to allowing engagement between the runner 110 and the fluid film thrust bearing 124 or another type of thrust bearing). In one or more embodiments, both the upper surface 202 of the runner 110 and the fluid film thrust bearing 124 are void of (e.g., lack) low friction coatings since there is no physical contact. The omission of the low friction coating may reduce manufacturing costs and increase production efficiency of the thrust bearing assembly 102.

The fluid cushion generated by the fluid film thrust bearing 124 may be composed of oil, gas (e.g., air), or another fluid. In at least one embodiment, the fluid film thrust bearing 124 is an air bearing such that the fluid cushion is an air cushion. The fluid film thrust bearing 124 may be hydrostatic or hydrodynamic. For example, in an embodiment in which the fluid film thrust bearing 124 is hydrostatic, the fluid film thrust bearing 124 may generate the fluid cushion by directing or channeling fluid provided by an external fluid source into the narrow gap 306. The external fluid source may be an air or oil pump or the like that pressurizes the fluid, or a portion of the machine's working fluid. In the case of the fluid source being external, the formation of the fluid cushion may not be tied to the shaft's rotation but rather by the operation of the fluid source itself. The fluid film thrust bearing 124 may define small apertures that direction the fluid through the thrust bearing 124 to the narrow gap 306. In a different embodiment in which the fluid film thrust bearing 124 is hydrodynamic, the fluid film thrust bearing 124 may generate the fluid cushion based on the relative rotation between the runner 110 and the thrust bearing 124. For example, the hydrodynamic fluid film thrust bearing 124 may be sized and shaped such that the relative rotation pulls the fluid into the narrow gap 306 via viscosity effects.

Figure 5:
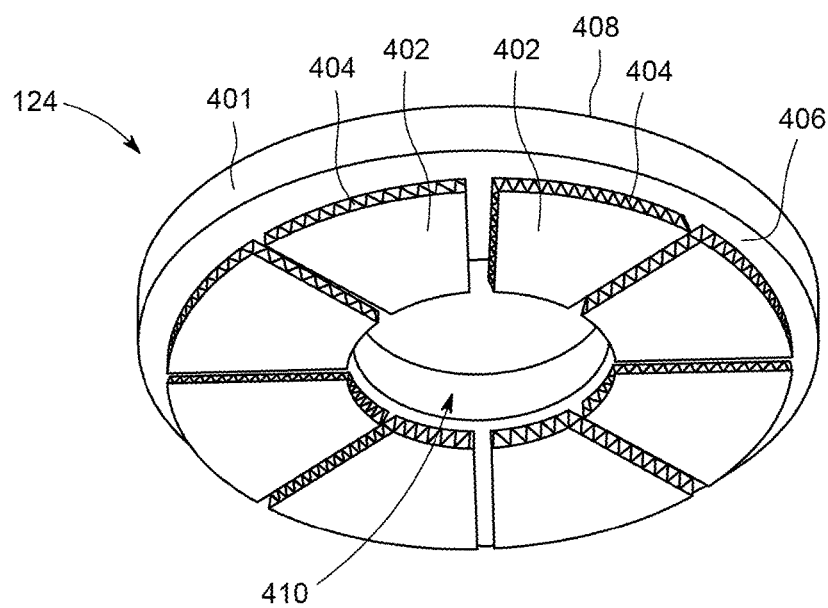
FIG. 5 is a perspective view of one embodiment of a fluid film thrust bearing of the thrust bearing assembly shown in FIG. 1.

FIG. 5 is a perspective view of one embodiment of the fluid film thrust bearing 124 of the thrust bearing assembly 102 shown in FIG. 1. In the illustrated embodiment, the fluid film thrust bearing 124 is a hydrodynamic air thrust bearing that is configured to generate the air cushion based on the rotational movement of the rotor 104 (FIG. 1). More specifically, the fluid film thrust bearing 124 in the illustrated embodiment is a foil thrust bearing. The foil thrust bearing 124 includes a main body 401 and multiple pads 402 that are disposed on and supported by the main body 401. The multiple pads 402 are annularly arranged side by side along a working side 406 of the main body 401. The working side 406 is opposite a mounting side 408 of the main body 401, which is configured to be mounted to the stator housing 122. The pads 402 may be angled or tilted relative to the working side 406 of the main body 401. The tilt of the pads 402 in combination with the rotation of the rotor 104 may provide the viscosity effects that generate the air cushion. The pads 402 may be supported on a spring base 404, which may be a bump foil spring. The bump foil spring is optionally corrugated. The foil thrust bearing 124 defines a central cavity 410 that receives the shaft 106 (FIG. 1) of the rotor 104 therethrough.

In other embodiments, the fluid film thrust bearing 124 may be other types of thrust bearings other than a hydrodynamic foil thrust bearing. For example, the fluid film thrust bearing 124 may be a tilting pad thrust bearing, a tapered land thrust bearing, a flat land thrust bearing, or the like. The fluid cushion may be provided by oil or another fluid that is injected into the narrow gap 306 (shown in FIG. 4) or that coats and/or floods the thrust bearing.

Figure 6:
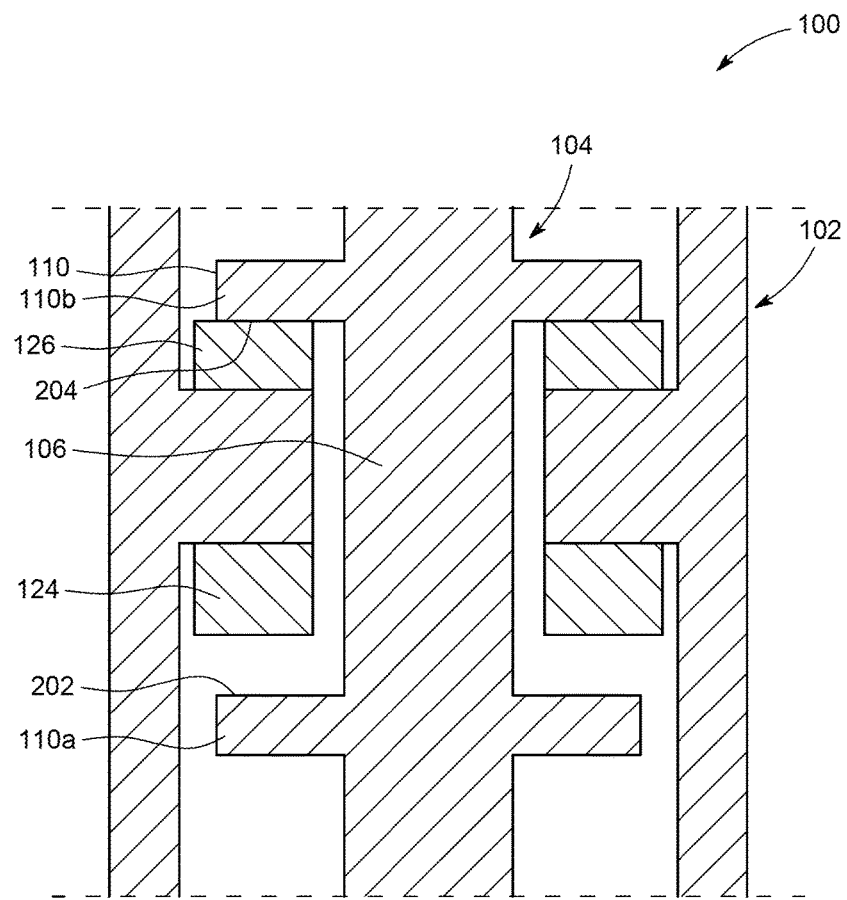
FIG. 6 is an enlarged view of a portion of another embodiment of the machine shown in FIG. 1 with the rotor and the thrust bearing assembly.

FIG. 6 is an enlarged view of a portion of another embodiment of the machine 100 shown in FIG. 1 with the rotor 104 and the thrust bearing assembly 102. Unlike the embodiment of the rotor 104 shown in FIGS. 1, 2, and 4, the rotor 104 in the illustrated embodiment includes multiple runners 110 that are axially spaced apart along the shaft 106. A first runner 110a of the runners 110 defines the upper surface 202. The fluid film thrust bearing 124 is disposed above the first runner 110a. A second runner 110b of the runners 110 defines the lower surface 204. The ring bearing 126 is disposed below the second runner 110b. In the illustrated embodiment the second runner 110b is located above the first runner 110a, but in an alternative embodiment the second runner 110b may be below the first runner 110a.

In the illustrated embodiment, the machine 100 functions in the same way as the embodiment shown in FIGS. 1, 2, and 4. For example, while the rotor 104 is static or rotating less than the threshold speed, gravity (e.g., weight) forces the rotor 104 into the rest position, which is shown in FIG. 6. In the rest position, the lower surface 204 of the runner 110b engages the ring bearing 126 to vertically support the rotor 104. Upon the rotational speed of the rotor 104 exceeding the threshold speed, the tuned upward thrust force exerted by the working fluid on the rotor 104 overcomes the downward gravitational and thrust forces, causing the rotor 104 to rise vertically to the lifted position. As the rotor 104 rises, the runner 110a moves toward the fluid film thrust bearing 124, but the fluid cushion prevents the upper surface 202 from engaging the fluid film thrust bearing 124.

Figure 7:
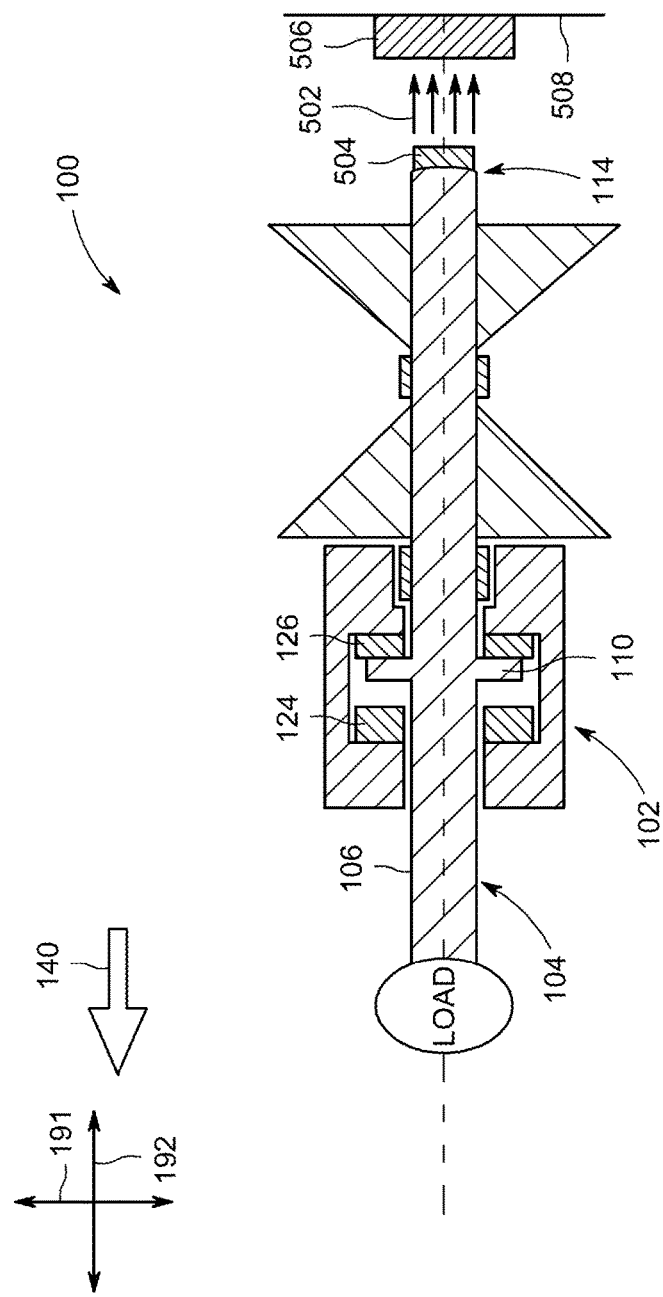
FIG. 7 is a cross-sectional illustration of another embodiment of the machine shown in FIG. 1.

FIG. 7 is a cross-sectional illustration of another embodiment of the machine 100 shown in FIG. 1. Unlike in FIG. 1, the shaft 106 of the rotor 104 in the illustrated embodiment is not oriented parallel to the vertical axis 191 and is not parallel to gravity. The shaft 106 of the rotor 104 in FIG. 7 is oriented parallel to a lateral axis 192 that is perpendicular to the vertical axis 191 and to gravity. The machine 100 in FIG. 7 functions similarly to the machine 100 in FIG. 1 because the rotor 104 in FIG. 7 is still biased towards the rest position. In the illustrated embodiment, the biasing force is not gravitational force, but rather is a magnetic force 502 exerted on the rotor 104. The magnetic force 502 pushes and/or pulls the rotor 104 towards the rest position, such that the runner 110 is biased towards the ring bearing 126 of the thrust bearing assembly 102. In the illustrated embodiment, the magnetic force 502 is provided by the attraction between a first magnet unit 504 (e.g., including one or more magnets) mounted to the first end 114 of the shaft 106 and a second magnet unit 506 mounted to an external structure 508. The machine 100 and the magnets 504, 506 may be tuned and designed such that, upon the rotational speed of the rotor 104 exceeding the designated threshold speed, the thrust force 140 exerted on the rotor 104 along the lateral axis 192 towards the fluid film thrust bearing 124 exceeds the magnetic force 502 in the opposite direction, causing the rotor 104 to axially move towards the lifted position.

Although the shaft 106 is oriented perpendicularly to the vertical axis 191 (and to gravity) in the illustrated embodiment, it is recognized that the shaft 106 may have other orientations relative to the axes 191, 192 in other embodiments. Furthermore, other biasing mechanisms may be used to exert a biasing force on the rotor 104 towards the rest position in other embodiments, such as springs.

Certain embodiments of the present disclosure provide a machine and a thrust bearing assembly thereof that includes a vertical rotor shaft orientation, a designed thrust load in the upward axial direction, a fluid film thrust bearing mating with an upper runner surface, and a carbon ring mating with a lower runner surface. The machine is designed such that the lower runner surface rubs against the carbon ring at relatively low speeds (compared to the operating speeds) during start-up and shut-down due to gravity. The carbon ring bearing may provide a good wear couple that is inexpensive (e.g., relative to the fluid film thrust bearing and conventional thrust bearings). The machine is further designed such that the upper runner surface does not engage the fluid film thrust bearing at any time, including during start-up, full operation, shut-down, idling, and static (e.g., off). Due to the lack of contact, the machine may omit low friction wear coatings on the upper runner surface and the fluid film thrust bearing, further reducing cost.

The machine according to the described herein may be a relatively small turbo-machine. For example, the machine may be a small gas turbine engine, such as an auxiliary power unit (APU) of an aircraft or ground-based unit. The machine may be operated in predictable, set orientations. For example, in an embodiment in which the machine is an APU of an aircraft, the APU may be operated only, or primarily, when the aircraft is on the ground.

Certain embodiments of the present disclosure provide a thrust bearing assembly for a machine. The thrust bearing assembly includes a stator housing, a fluid film thrust bearing, and a ring bearing. In at least one embodiment, neither the fluid film thrust bearing nor the ring bearing is a rolling element bearing. The stator housing is configured to surround at least a segment of a rotor shaft and one or more runners on the rotor shaft. The one or more runners include a first runner surface and a second runner surface that face in opposite axial directions along the shaft. The fluid film thrust bearing is axially held between a first stator surface of the stator housing and the first runner surface. The fluid film thrust bearing is configured to generate a fluid cushion that blocks the first runner surface from engaging the fluid film thrust bearing. The ring bearing is axially held between a second stator surface of the stator housing and the second runner surface. The ring bearing has an annular contact surface that engages the second runner surface to axially support the rotor shaft.

Optionally, the stator housing is sized and shaped to allow the rotor shaft and the one or more runners to float axially relative to the fluid film thrust bearing and the ring bearing.

Optionally, the rotor is configured to axially move relative to the stator housing from a rest position in which the second runner surface engages the annular contact surface of the ring bearing towards the fluid film thrust bearing responsive to a rotational speed of the rotor exceeding a threshold speed. Optionally, the ring bearing disengages the second runner surface responsive to the rotor axially moving from the rest position towards the fluid film thrust bearing. Optionally, the fluid film thrust bearing is axially spaced apart from the first runner surface by a gap when the rotor is in the rest position, and is axially spaced apart from the first runner surface by the fluid cushion responsive to the rotor axially moving into the gap towards the fluid film thrust bearing.

Optionally, the one or more runners include one runner that defines both the first runner surface and the second runner surface such that the one runner is disposed axially between the fluid film thrust bearing and the ring bearing.

Optionally, the one or more runners include a first runner and a second runner that are axially spaced apart along the rotor shaft. The first runner defines the first runner surface, and the second runner defines the second runner surface.

Optionally, the fluid film thrust bearing is a hydrodynamic air thrust bearing configured to generate an air cushion based on rotational movement of the rotor shaft.

Optionally, the fluid film thrust bearing is a hydrostatic air thrust bearing configured to generate the fluid cushion by directing fluid from an external fluid source between the fluid film thrust bearing and the first runner surface.

Optionally, the first runner surface faces vertically upward relative to gravity and the second runner surface faces vertically downward relative to gravity. The fluid film thrust bearing is located above the first runner surface relative to gravity, and the ring bearing is located below the second runner surface relative to gravity.

Optionally, the fluid film thrust bearing is a foil thrust bearing. Optionally, the ring bearing is a carbon ring.

Certain embodiments of the present disclosure provide a machine that includes a rotor, a stator housing, and a fluid film thrust bearing. The rotor includes a shaft and one or more runners on the shaft. The shaft is elongated along a shaft axis oriented parallel to gravity between a top end and a bottom end of the shaft. The stator housing surrounds at least a segment of the shaft including the one or more runners. The fluid film thrust bearing is axially held between an upper surface of the one or more runners and the stator housing. The upper surface faces towards the top end of the shaft. The rotor is configured to axially move relative to the stator housing towards the fluid film thrust bearing from a rest position to a lifted position responsive to a rotational speed of the rotor exceeding a threshold speed. The fluid film thrust bearing is configured to generate a fluid cushion that blocks axial movement of the rotor beyond the lifted position.

Optionally, the fluid film thrust bearing is mounted to the stator housing and is axially spaced apart from the upper surface at both the rest position and the lifted position of the rotor.

Optionally, the rotor is biased towards the ring bearing due to the force of gravity and is disposed in the rest position at rotational speeds of the rotor that are slower than the threshold speed.

Optionally, the machine further includes a ring bearing axially held between a lower surface of the one or more runners and the stator housing. The lower surface faces towards the bottom end of the shaft. The ring bearing has an annular contact surface that engages the lower surface when the rotor is in the rest position to axially support the rotor. Optionally, the ring bearing is axially spaced apart from the lower surface of the one or more runners when the rotor is in the lifted position. Optionally, the one or more runners include a first runner that defines both the upper surface and the lower surface such that the first runner is disposed axially between the fluid film thrust bearing and the ring bearing.

Certain embodiments of the present disclosure provide a machine that includes a rotor and a thrust bearing assembly. The rotor includes a shaft and one or more runners on the shaft. The shaft is elongated along a shaft axis. The one or more runners include a first runner surface and a second runner surface that face in opposite directions along the shaft axis. The thrust bearing assembly includes a fluid film thrust bearing and a ring bearing. The fluid film thrust bearing is axially located between the first runner surface and a first stator surface of a stator housing. The ring bearing is axially located between the second runner surface and a second stator surface of the stator housing. The rotor is configured to axially move relative to the thrust bearing assembly from a rest position to a lifted position responsive to a rotational speed of the rotor exceeding a threshold speed. The rotor is biased towards the rest position by a biasing force. The ring bearing has an annular contact surface that engages the second runner surface when the rotor is in the rest position to axially support the rotor.

Optionally, the fluid film thrust bearing generates a fluid cushion that blocks axial movement of the rotor beyond the lifted position without the first runner surface engaging the fluid film thrust bearing.

Optionally, the biasing force on the rotor towards the rest position is provided by one or more of gravity, a spring, or a magnet.

Optionally, the ring bearing is axially spaced apart from the second runner surface of the one or more runners when the rotor is in the lifted position.

Optionally, the ring bearing is a carbon ring.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A thrust bearing assembly for a machine, the thrust bearing assembly comprising:
    a stator housing configured to surround at least a segment of a rotor shaft and one or more runners on the rotor shaft, the one or more runners including a first runner surface and a second runner surface that face in opposite axial directions along the rotor shaft;
    a fluid film thrust bearing axially held between a first stator surface of the stator housing and the first runner surface, the fluid film thrust bearing configured to generate a fluid cushion that blocks the first runner surface from engaging the fluid film thrust bearing; and
    a ring bearing axially held between a second stator surface of the stator housing and the second runner surface, the ring bearing having an annular contact surface that engages the second runner surface to axially support the rotor shaft.

2. The thrust bearing assembly of claim 1, wherein the stator housing is sized and shaped to allow the rotor shaft and the one or more runners to float axially relative to the fluid film thrust bearing and the ring bearing.

3. The thrust bearing assembly of claim 1, wherein the rotor shaft is configured to axially move relative to the stator housing from a rest position in which the second runner surface engages the annular contact surface of the ring bearing towards the fluid film thrust bearing responsive to a rotational speed of the rotor shaft exceeding a threshold speed.

4. The thrust bearing assembly of claim 3, wherein the ring bearing disengages the second runner surface responsive to the rotor shaft axially moving from the rest position towards the fluid film thrust bearing.

5. The thrust bearing assembly of claim 3, wherein the fluid film thrust bearing is axially spaced apart from the first runner surface by a gap when the rotor shaft is in the rest position, and is axially spaced apart from the first runner surface by the fluid cushion responsive to the rotor shaft axially moving into the gap towards the fluid film thrust bearing.

6. The thrust bearing assembly of claim 1, wherein the one or more runners include one runner that defines both the first runner surface and the second runner surface such that the one runner is disposed axially between the fluid film thrust bearing and the ring bearing.

7. The thrust bearing assembly of claim 1, wherein the one or more runners include a first runner and a second runner that are axially spaced apart along the rotor shaft, the first runner defining the first runner surface, the second runner defining the second runner surface.

8. The thrust bearing assembly of claim 1, wherein the fluid film thrust bearing is a hydrodynamic air thrust bearing configured to generate an air cushion that represents the fluid cushion based on rotational movement of the rotor shaft.

9. The thrust bearing assembly of claim 1, wherein the fluid film thrust bearing is a hydrostatic air thrust bearing configured to generate the fluid cushion by directing fluid from an external fluid source between the fluid film thrust bearing and the first runner surface.

10. The thrust bearing assembly of claim 1, wherein the first runner surface faces vertically upward relative to gravity and the second runner surface faces vertically downward relative to gravity, wherein the fluid film thrust bearing is located above the first runner surface relative to gravity, and the ring bearing is located below the second runner surface relative to gravity.

11. The thrust bearing assembly of claim 1, wherein the fluid film thrust bearing is a foil thrust bearing.

12. The thrust bearing assembly of claim 1, wherein the ring bearing is a carbon ring.

13. The thrust bearing assembly of claim 1, wherein the annular contact surface of the ring bearing extends continuously and uniformly along an entire circumference of the ring bearing.

14. A machine comprising:
    a rotor including a shaft and one or more runners on the shaft, the shaft elongated along a shaft axis oriented parallel to gravity between a top end and a bottom end of the shaft;
    a stator housing surrounding at least a segment of the shaft including the one or more runners;
    a fluid film thrust bearing axially held between an upper surface of the one or more runners and the stator housing, the upper surface facing towards the top end of the shaft, and
    a ring bearing axially held between a lower surface of the one or more runners and the stator housing, the lower surface facing towards the bottom end of the shaft, the ring bearing having an annular contact surface that engages the lower surface when the rotor is in a rest position to axially support the rotor,
    wherein the rotor is configured to axially move relative to the stator housing towards the fluid film thrust bearing from the rest position to a lifted position responsive to a rotational speed of the rotor exceeding a threshold speed, and wherein the fluid film thrust bearing is configured to generate a fluid cushion that blocks axial movement of the rotor beyond the lifted position.

15. The machine of claim 14, wherein the fluid film thrust bearing is mounted to the stator housing and is axially spaced apart from the upper surface at both the rest position and the lifted position of the rotor.

16. The machine of claim 14, wherein the rotor is biased towards the ring bearing due to the force of gravity and is disposed in the rest position at rotational speeds of the rotor that are slower than the threshold speed.

17. The machine of claim 14, wherein the ring bearing is axially spaced apart from the lower surface of the one or more runners when the rotor is in the lifted position.

18. The machine of claim 14, wherein the one or more runners include a first runner that defines both the upper surface and the lower surface such that the first runner is disposed axially between the fluid film thrust bearing and the ring bearing.

19. A machine comprising:
    a rotor including a shaft and one or more runners on the shaft, the shaft elongated along a shaft axis, the one or more runners including a first runner surface and a second runner surface that face in opposite directions along the shaft axis; and a thrust bearing assembly including a fluid film thrust bearing and a ring bearing, the fluid film thrust bearing axially located between the first runner surface and a first stator surface of a stator housing, the ring bearing axially located between the second runner surface and a second stator surface of the stator housing, wherein the rotor is configured to axially move relative to the thrust bearing assembly from a rest position to a lifted position responsive to a rotational speed of the rotor exceeding a threshold speed, the rotor biased towards the rest position by a biasing force, wherein the ring bearing has an annular contact surface that engages the second runner surface when the rotor is in the rest position to axially support the rotor.

20. The machine of claim 19, wherein the fluid film thrust bearing generates a fluid cushion that blocks axial movement of the rotor beyond the lifted position without the first runner surface engaging the fluid film thrust bearing.

21. The machine of claim 19, wherein the biasing force on the rotor towards the rest position is provided by one or more of gravity, a spring, or a magnet.

22. The machine of claim 19, wherein the ring bearing is axially spaced apart from the second runner surface of the one or more runners when the rotor is in the lifted position.

23. The machine of claim 19, wherein the ring bearing is a carbon ring.

* * * * *